No. 835,970. PATENTED NOV. 13, 1906.
S. I. MERWIN.
ADJUSTABLE HARROW OR CULTIVATOR.
APPLICATION FILED MAR. 23, 1906.

2 SHEETS—SHEET 1.

Witnesses

Inventor
S. I. Merwin
By Lacey, Attorneys

No. 835,970. PATENTED NOV. 13, 1906.
S. I. MERWIN.
ADJUSTABLE HARROW OR CULTIVATOR.
APPLICATION FILED MAR. 23, 1906.
2 SHEETS—SHEET 2.
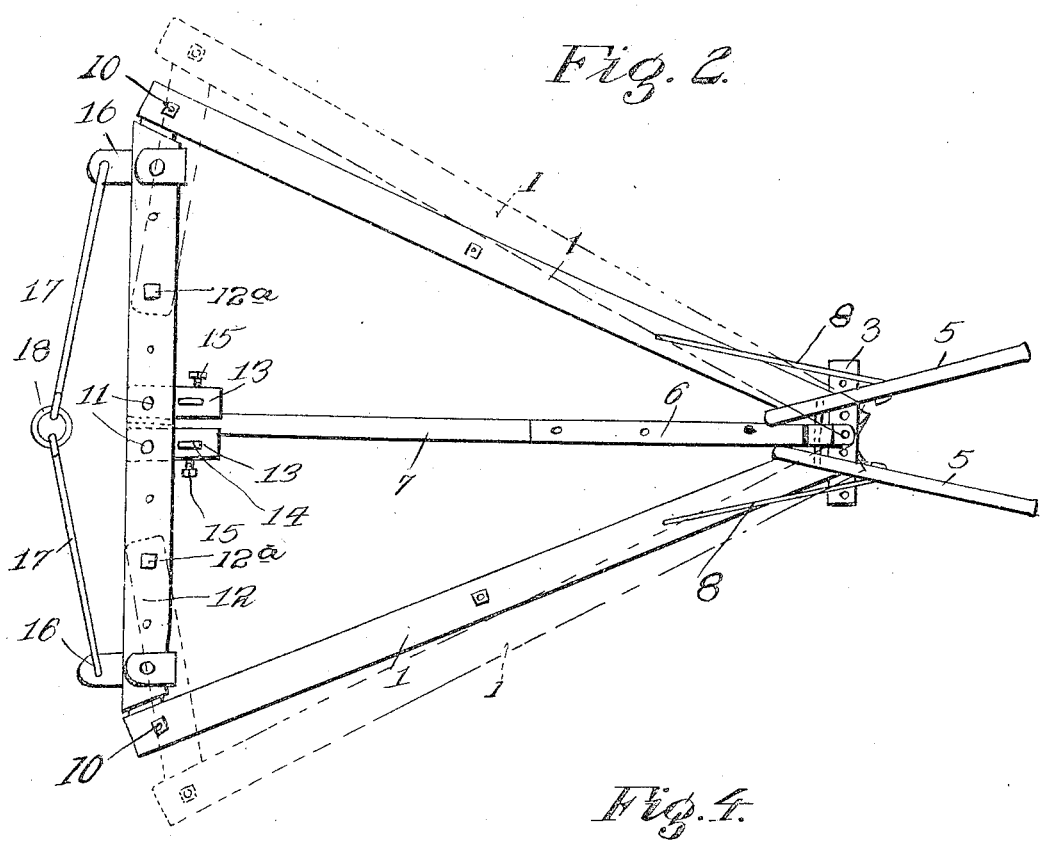
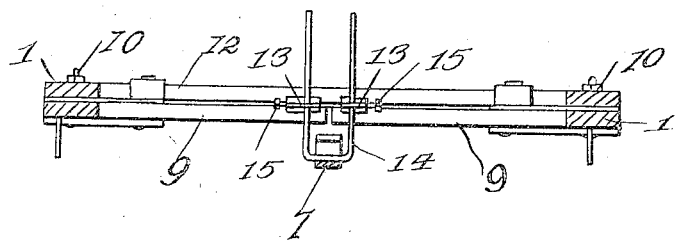

UNITED STATES PATENT OFFICE.

SAMUEL I. MERWIN, OF PALATKA, FLORIDA.

ADJUSTABLE HARROW OR CULTIVATOR.

No. 835,970.

Specification of Letters Patent.

Patented Nov. 13, 1906.

Application filed March 23, 1906. Serial No. 307,694.

*To all whom it may concern:*

Be it known that I, SAMUEL I. MERWIN, a citizen of the United States, residing at Palatka, in the county of Putnam and State of Florida, have invented certain new and useful Improvements in Adjustable Harrows or Cultivators, of which the following is a specification.

This invention consists of novel improvements in agricultural implements, and comprises a special construction of cultivator or harrow particularly designed for the cultivation of potatoes or similar crops, which are planted on beds with a furrow or hollow between, the implement being adapted for adjustment to any width rows or furrows as limited only by the special size thereof.

For a full description of the invention and the merits thereof and also to acquire a knowledge of the details of construction of the means for effecting the result reference is to be had to the following description and accompanying drawings, in which—

Figure 1:
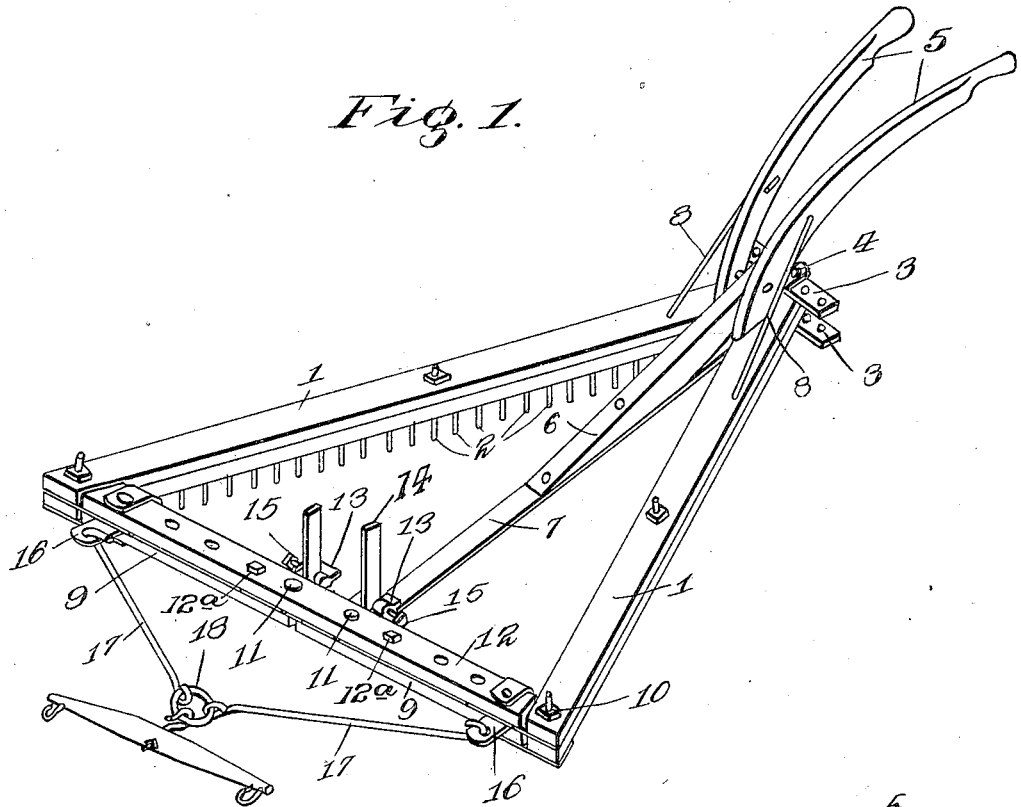
Figure 3:
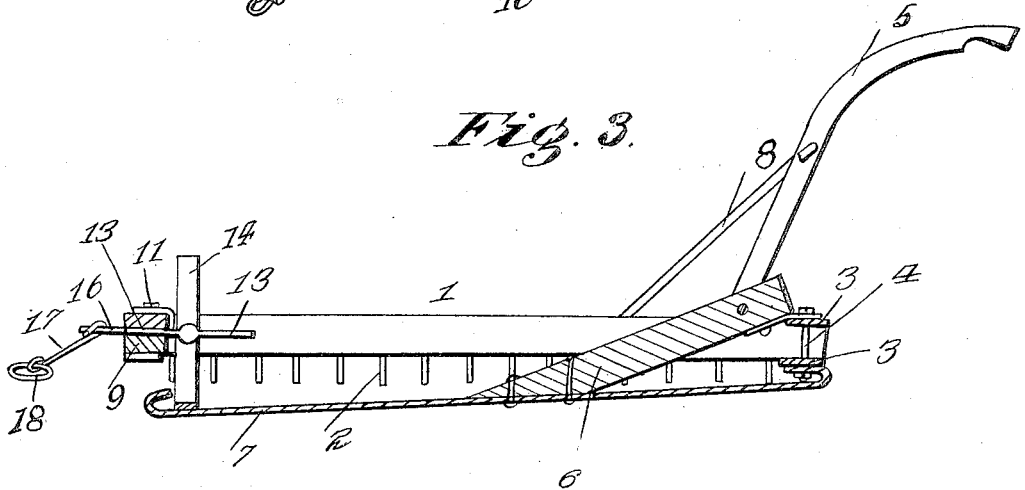

Figure 1 is a perspective view of a harrow embodying the invention. Fig. 2 is a top plan view. Fig. 3 is a vertical longitudinal section taken through the runner. Fig. 4 is a transverse section looking in the direction of the adjustable supporting-yoke of the runner.

Corresponding and like parts are referred to in the following description and indicated in all the views of the drawings by the same reference characters.

In the practical embodiment of the invention it is contemplated to provide the customary frame composed of the longitudinal bars 1 and transverse connecting means at the front ends of the bars for adjusting the same according to the width of the rows or furrows which are to be operated upon by means of the implement. In this instance the bars 1 are provided with suitable teeth 2 and are attached together at their rear ends by superposed plates 3, having a plurality of openings through which pins 4 may pass to also afford adjustable connecting means between the rear extremities of the bars 1. Suitable handles 5 extend upwardly from the rear portion of the frame of the implement, being connected at their lower ends with a short beam 6, attached to a runner 7, the handles being braced by suitable braces 8, connecting them with the bars 1. The beam 6 has pivotal connection at its rear end with the lower extremities of the handles 5 and is substantially secured to the runner 7 to subserve the rigidity of the latter in a manner which will be apparent. The transverse connecting means for attaching the front ends of the bars 1 together embodies the short bars 9, having pivotal connection at their outer extremities, as shown at 10, with the bars 1. Pins 11 permanently attach arms 13 to the beam 12, said arms 13 projecting rearwardly from the beam 12 and being provided with slots receiving the sides of a yoke 14. Set-screws 15 on the arms 13 are adapted to engage with the sides of the yoke 14, so as to adjust the latter vertically.

The yoke 14 by reason of connection with the front end of the runner 7 is adapted to support the runner in an adjusted position. Adjustment of the runner will vary the depth of the cultivation of the soil by raising and lowering the front portion of the frame of the implement in an evident manner. The pivots 10 may consist of bolts which permanently connect the bars 9 with the forward ends of the bars 1. The beam 12 and the bars 9 are provided with a plurality of vertically-registering openings at intervals in the length thereof, and vertical pins or fastenings 12$^a$ are used to connect the adjacent ends of the bars 9 with the beam 12, such fastenings 12$^a$ being adapted to pass through any of the registering openings of the beam 12 and bars 9. Should it be desired to widen the cultivator, it is only necessary to remove the fastenings 12$^a$, force the bars 1 outwardly or away from the ends of the beam 12 until certain of the openings in the bars 9 and beam 12 register, whereupon the fastenings 12$^a$ may be again inserted into such openings and the bars 1 will be held at the desired adjustment. Fastenings 16$^a$ are used to attach draft-plates 16 to the outer ends of the beam 12, and hook-rods 17 connect with the draft-plates. A ring 18 connects the hook-rods 17 to admit of ready connection of a swingletree or similar draft means to the implement.

Having thus described the invention, what is claimed as new is—

1. In an implement of the class described, the combination of a frame composed of longitudinal bars, harrow-teeth applied to said bars, adjustable means connecting the rear ends of the bars, means adjustably connecting the front ends of the bars and comprising a transverse beam and complemental short bars connected with said beam, and draft means connected with the front portion of the implement.

2. In an implement of the class described, the combination of a frame composed of longitudinal bars, harrow-teeth applied to said bars, means adjustably connecting the front ends of the bars and comprising a transverse beam and complemental short bars having connection with said beam, arms projecting from the transverse bar, a yoke vertically adjustable on said arms, and a runner connected with the frame and with the yoke and adjustable with the latter.

3. In an implement of the class described, the combination of a frame composed of longitudinal bars, harrow-teeth applied to the bars, means adjustably connecting the front ends of the bars and comprising a transverse beam and complemental short bars having connection with said beam, arms projecting from the transverse bar, a yoke vertically adjustable on said arms, a runner secured at its front end to the yoke for adjustment thereby, and a longitudinal beam pivoted at its rear end to the rear portion of the implement and attached to the runner, as specified.

4. In an implement of the class described, the combination of a frame embodying bars provided with cultivating-teeth, transverse connecting means between the front ends of the bars, a longitudinal runner mounted on the frame, means carried by the transverse connecting means aforesaid to adjust the front end of the runner for the purpose specified, and a longitudinal beam connected with the frame of the implement and having connection with the runner aforesaid.

5. In an implement of the class described, the combination of a frame, cultivating-teeth applied thereto, handles connected with the frame, a longitudinal beam pivotally connected with said handles, a longitudinal runner attached to the beam, and means for adjusting the runner.

6. In an implement of the class described, the combination of a frame embodying longitudinal bars, teeth applied to said bars, adjustable means connecting the bars, a yoke adjustably mounted upon the aforesaid connecting means, and a longitudinal runner mounted on the frame of the implement and having connection with said yoke.

In testimony whereof I affix my signature in presence of two witnesses.

SAMUEL I. MERWIN. [L. S.]

Witnesses:
H. R. ESTES,
GUY C. ESTES.